United States Patent [19]

Miller

[11] Patent Number: 4,482,384
[45] Date of Patent: Nov. 13, 1984

[54] CEMENTITIOUS COMPOSITIONS AND METHODS OF MAKING SAME

[75] Inventor: Charles H. Miller, North Shore, Calif.

[73] Assignee: Eterna-Tec Corporation, Porter, Ind.

[21] Appl. No.: 470,244

[22] Filed: Feb. 28, 1983

[51] Int. Cl.³ .................. C04B 7/352; C04B 7/355
[52] U.S. Cl. .............................. 106/92; 106/95; 106/104; 106/315
[58] Field of Search ............ 106/92, 95, 315, 90; 106/104

[56] References Cited

U.S. PATENT DOCUMENTS

| | | | |
|---|---|---|---|
| 3,008,843 | 11/1961 | Jolly | 106/90 |
| 3,537,869 | 11/1970 | Proell | 106/95 |
| 3,547,665 | 12/1970 | Johnson | 106/90 |
| 3,600,203 | 8/1971 | Aldera | 106/104 |
| 3,656,979 | 4/1972 | Striebel et al. | 106/90 |
| 4,058,407 | 11/1977 | Ray | 106/92 |

*Primary Examiner*—James Poer
*Attorney, Agent, or Firm*—Ronald A. Sandler; Jerry A. Schulman

[57] ABSTRACT

The present invention is directed to an additive composition or admixture for incorporation in cementitious compositions such as concretes, mortars and grouts, neat cement mixes, and dry mixes for the same. These cementitious mixtures are especially suited for application in adverse environments such as undersea, desert, or alkaline soil conditions. The cementitious compositions include Portland cement, refractory cement, an alkaline metal carbonate, a carbohydrate, a fatty acid ester, and preferably, a suitable aggregate.

17 Claims, No Drawings

CEMENTITIOUS COMPOSITIONS AND METHODS OF MAKING SAME

BACKGROUND OF THE INVENTION

The present invention is directed to an improved cementitious composition and method of making the same. In particular, the invention is directed to additives which enhance the physical properties of cementitious compositions lending their application to anchor systems for use in the most adverse environments, i.e. undersea, desert, and alkaline soil conditions. A particular advantageous use is as the formation of undersea or sand anchors requiring little or no preparation or excavation of the soil substrate.

Generally, cementitious compositions are based upon mixtures of Portland cement with additives which impart certain desirable properties and are made for exposure to various environments. For instance, fatty acid esters are used as an additive to impart water repellency to the finished cement. Additives of this type are disclosed in U.S. Pat. No. 3,008,843, granted to Jolly (partial esters of common fatty acids), U.S. Pat. No. 3,656,979, granted to Striebel, et al. (tertiary, saturated aliphatic monocarboxylic acids), and U.S. Pat. No. 3,547,665, granted to Johnson (animal fat, glycerides, and fatty acid additives dispersed in water). Other patents disclose using acid ester additives to improve the compressive strength of cement mixtures, i.e. U.S. Pat. No. 3,537,869, granted to Proell (lecithins) and U.S. Pat. No. 4,286,992, granted to Galer et al., (hydroxy polycarboxylic acids). Other organic substances and oils are required to be included with many of these fatty acid additives for optimum performance. The amount of additive is often in excess of several percent of the cement's total weight. Even these large quantities do not achieve the result of the present invention, with attendant savings in cost. Besides the inherent problems of dispersing large quantities of organic additives in a cement mix, additional steps are often required after setting the cement. For example, heating the cement's surface to impart the desired properties is disclosed in U.S. Pat. No. 4,207,115, granted to Boehme et al. Moreover, the use of these additives in a cold environment is severely limited. Whereas, the present invention not only can be poured at freezing temperatures but can also use near-freezing water as a mixing agent.

Carbohydrate materials are commonly added to delay the setting time and increase the compressive strength of the cement. U.S. Pat. No. 3,432,317, granted to Kelly et al., and U.S. Pat. No. 4,058,407, granted to Ray, disclose polysaccharides and carob tree fruit, respectively, for these desired properties. The use of these additives in large quantities however, risks complete or severe inhibition of hydration and hardening. Further, the potential unavailability and cost of these additives warrant use of the alternate admixtures of the present invention. The novel combination of a carbohydrate with a fatty acid ester and an alkali metal carbonate is disclosed only by the present invention.

Alkali metal carbonates are known to increase the compressive strength of a cement. U.S. Pat. No. 2,806,530 granted to Binkley and its continuation-in-part U.S. Pat. No. 2,868,295 disclose lithium carbonate as part of a treating agent applied to a cement filter cake under pressure. The Uchikawa et al., U.S. Pat. No. 3,819,389, discloses the use of alkali earth metals to make rapid hardening cement mixtures. U.S. Pat. No. 3,118,222 granted to Harris, and U.S. Pat. Nos. 3,139,351 and 3,223,542 granted to Hammer, disclose the use of alkali metal carbonates to improve the cosmetic appearance of the cement by reducing efflorescence and making a waterproofing solution for holes and cracks. Although lithium carbonate is known to increase the compressive strength of the cement, it has not been directly added as part of the cement mix, as per the present invention. Also, the present invention discloses a novel composition combining an alkali metal carbonate with a carbohydrate and a fatty acid ester.

Several problems have arisen in using cements containing additives found in the prior art under the adverse environmental conditions. For instance, undersea application has been complicated by the tendency of cements to disperse in water before completely setting. Sea currents and surges further complicate the integrity of the cement. These cements shrink, making structural degradation more probable. Contamination of the mixing water with either salt or dissolved mineral brines complicates mixing a proper cement formulation. The resultant cement products often exhibit degradation due to calcium sulfate rot and a loss in compressive strength. Also, the near freezing temperature of the mixing water and the similarly cold pouring conditions often prevent such cements from properly setting. Use of the cements for undersea anchor systems have exhibited cold-flow characteristics when placed under shear loads, leading to early failure of the anchoring system.

Similar problems arise when cements are used in anchoring systems under high alkaline soil conditions, i.e. deserts. The degradation and other problems which accompany use of prior art cements in this type of environment are eliminated by the cementitious compositions contained in the present invention.

SUMMARY OF THE INVENTION

The present invention comprises a cementitious composition capable of providing substantially improved compressive strength even under adverse environmental conditions. The problems of the prior art cements are obviated by the present invention.

It is a primary object of the invention to provide a cementitious composition of the type set forth which exhibits greater compressive strength than cements of the prior art, even under adverse environmental conditions.

A further object of the present invention is to provide a cementitious composition which is hydrolized by and is otherwise fully compatible with the salt and dissolved mineral brines of the oceans and seas.

A still further object of the present invention is to provide a cementitious composition which sets quickly regardless of the quality of the mixing water or pouring environment.

Another object of the present invention is to provide a cementitious composition which provides full wetted surface fidelity by eliminating shrinkage during and after setting of the composition.

A still further object of the present invention is to provide an improved underwater anchoring system and article utilizing the cementitious composition of the invention which does not exhibit cold-flow characteristics under shear loads.

Yet another object of the present invention is to provide a cementitious composition which uses mixing water containing salt and mineral brines which does not degrade due to calcium sulfate rot or lose compressive strength after setting.

Still another object of the present invention is to provide a cementitious composition for undersea application which is cohesive in the fluid state to remain discrete while handled through sea stream surge conditions.

A further object of the present invention is to provide a cementitious composition which may use mixing water at freezing temperatures and be poured under similar air or underwater temperatures.

Briefly, in accordance with the present invention, there is provided a cementitious mixture which includes Portland cement; refractory cement; an alkali metal carbonate; a carbohydrate; and, a fatty acid ester. A method of making a cementitious mixture of this type includes the step of mixing together the amounts of Portland cement and refractory cement. This mixture is then subjected to shearing forces to produce a uniform mixture and the amounts of alkali metal carbonate, carbohydrate, and the fatty acid ester are added to the mixture.

The present invention also contemplates a method of making a concrete structure from the cementitious mixture described above. This method includes the steps of preparing a composition including approximately equal parts by weight of an alkali metal carbonate, a carbohydrate, and a fatty acid ester. This mixture is dispersed in a Portland and refractory cement mixture in sufficient quantity to afford strengthening effects. The cement mixture is poured to form the desired structure while adding water. The mixture is then allowed to harden.

To the accomplishment of the foregoing and still other objects and advantages, the invention, is best utilized in an anchor system capable of use undersea or in alkaline soils, the anchor is formed from a cementitious mixture which includes about 100 parts of Portland cement; and about 40 parts of refractory cement; about 0.03125 parts of lithium carbonate; about 0.027 parts of gum arabic or guar gum; and, about 0.041 parts of a water soluble lecithin.

The invention, together with further objects and advantages thereof, can best be understood by reference to the following specification, taken in connection with the accompanying claims.

DETAILED DESCRIPTION OF THE INVENTION

Broadly stated, the present invention is directed to an additive composition or an admixture for incorporation in cementitious compositions such as concretes, mortars and grouts, neat cement mixes, and dry mixes for making the above. Three main components make up the additive composition.

The first component of the additive composition is an alkali metal carbonate which is present in an amount approximately equal to each of the other two additive components. The preferred alkali metal carbonate in the present invention is lithium carbonate.

When the additive is incorporated into a cementitious mixture, the amount of the alkali metal carbonate present in the cementitious mixture is less than about two parts by weight. The present invention includes embodiments where the amount of alkali metal carbonate is between about 0.02 and 0.04 parts by weight. In the preferred embodiment, the alkali metal carbonate is present in an amount of about 0.03125 parts by weight.

The second component of the additive composition is a carbohydrate. The present invention contemplates the use of various carbohydrates, but prefers using either gum arabic or guar gum. Gum arabic is a product of an acacia tree of tropical Africa and is entirely soluble in water. Guar gum is derived from the seed of an annual plant which is cultivated in India. It is similar to the locust kernel gum in that it consists mainly of a polysaccharide of galactose and mannose and that it forms a gel with a borax solution. The carbohydrate is present in an amount approximately equal parts to each of the other two additive components.

When the additive is incorporated into a cementitious mixture, the amount of the carbohydrate present in the cementitious mixture is less than about two parts by weight. The present invention contemplates other embodiments in which the amount of the carbohydrate is between about 0.02 and 0.04 parts by weight. In the preferred embodiment, the carbohydrate is present in an amount of about 0.027 parts by weight.

The third component of the additive composition is a fatty acid ester. The present invention contemplates using various fatty acid esters, but prefers water soluble lecithin. The term lecithin as used in this specification is intended to include the natural lecithins such as admixtures containing cephalin or lipositol as well as pure lecithin itself, and the so-called water dispersable lecithins commonly sold in commerce, which are hydroxylated, maleinated, ethoxylated or glycidolated derivaties of natural lecithin mixtures, or blends of natural lecithin with small amounts of dispersants. These materials are all usable for the present invention, and such commercial lecithins are also referred to as fatty acid esters.

When the additive is incorporated into a cementitious mixture, the amount of the fatty acid ester present in the cementitious mixture is less than about two parts by weight. The present invention includes other embodiments in which the amount of fatty acid ester is between about 0.03 parts to 0.05 parts by weight. In the preferred embodiment, the fatty acid ester is present in an amount of about 0.041 parts by weight.

The cementitious mixtures contemplated by the present invention include Portland cement. For the purposes of this invention, the term Portland cement is intended to include all cementitious compositions which have a high content of tricalcium silicate and thus are Portland cement or are chemically similar or analogous to Portland cement, the specification for which is set forth in ASTM C 150-74. This would include cements in which fly ash, such as ash from steam or power generating stations, pozzolana slag, such as from blast furnaces, or mixtures of these, are incorporated and which result in Portland-type cement. The cementitious mixtures of the present invention include at least about 80 parts but not in excess of about 120 parts of Portland cement by weight. Other embodiments of the present invention include an amount of Portland cement between about 90 to 110 parts by weight of the cementitious mixture. The preferred amount of the Portland cement is about 100 parts by weight.

The cementitious mixtures also include refractory cement. The term refractory cement is intended to include all cementitious compositions which contain aluminum oxide to impart resistance to physical or chemical changes in the composition at high temperatures. The cementitious mixtures of the present invention include at least about 30 parts but not in excess of 90 parts by weight of refractory cement. The present invention includes cementitious mixtures where the amount of refractory cement is between about 35 to 70 parts by weight. In the preferred embodiment, the refractory amount is present in an amount of about 40 parts by weight.

The cementitious mixtures may also include a suitable aggregate. The aggregate is usually sand and crushed stone or gravel. Crushed slag or cinders are used in special kinds of cementitious mixtures. The present invention contemplates the use of various aggregates in an amount of about 210 parts by weight of the cementitious mixture.

Virtually any type of mixing water can be used to prepare a cementitious product from the mixtures of the present invention. The quality or type of water is immaterial. The use of water containing salt and dissolved mineral brines, similar to that found in the oceans and seas, provides a product which exhibits fast but manageable setting times, greatly improved compressive strength, full wetted surface fidelity, negligible cold-flow characteristics, degradation resistance, and discrete pouring characteristics. Thus, mixing water which would have produced deleterious consequences in prior art cements, can readily be used in the present invention to make a product with superior properties.

A method of making the above cementitious mixtures includes mixing together the amounts of Portland cement and refractory cement. This mixture is then subjected to shearing forces using any conventional equipment such as an impact mill to produce a uniform mixture. The amounts of the alkali metal carbonate, the carbohydrate, and the fatty acid ester may be added simultaneously or successively. The aggregate may then be added to the mixture while continuing to apply the high shearing forces. Any power mixing device can be employed with any type of container that has been rinsed out.

Another method contemplated by the present invention prepares a mixture of the alkali metal carbonate, the carbohydrate, and the fatty acid ester. A quantity of this composition is dispersed in a mixture of the Portland and refractory cement in sufficient quantity to afford strengthening effects to the cement mixture. The cement mixture is poured into the desired shape either after or while simulaneously adding water. The sequence of these steps is not critical. The mixture is then allowed to harden.

Having described the invention in general terms, the following example is set forth to more fully illustrate a preferred embodiment of the invention. This example, however, is not meant to be limiting. It is possible to produce still other embodiments without departing from the inventive concept herein disclosed. Such embodiments are within the ability of one skilled in the art.

EXAMPLE

A mixture of 100 parts Portland cement and 40 parts refractory cement were milled into a fine powder using a conventional impact mill. Lithium carbonate in an amount of 0.03125 parts by weight, gum arabic in an amount of 0.027 parts and water soluble lecithin (as a liquid) in an amount of 0.041 parts by weight were added simultaneously to the mixture of Portland and refractory cement to produce a uniform mixture. A sand and gravel aggregate was then added in an amount of 210 parts by weight using a conventional blade mixer. The mixture was milled into a fine powder. Ocean salt water at a temperature of about 35° F. was mixed with the cementitious compound to produce a mixture which was self leveling. The setting time for the composition was approximately 15 minutes which compares favorably to the setting times of prior art compositions. The setting time of the present invention can be adjusted for particular applications by varying the cement mix component amounts slightly. Surprisingly, the moisture content of the soil and various soil types had no effect on the physical properties or setting time. The resultant cement was usable after only 30 minutes, a great improvement over the time (several hours) required by prior art compositions. The compressive strength of the composition after approximately half an hour was in excess of 3,000 pounds per square inch. The composition had negligible shrinkage during and after setting. In contrast to prior art cements, there was no depreciation of physical properties with aging. In fact, the compressive strength continually increased over time.

Cementitious compositions made in accordance with the present invention are contemplated for use as sea anchors, earth shear anchors, undersea mining pick-up matrix, blow and seep containment, earth crack and fissure plugging, site terrain hardening, prod anchors, sewer out-fall stabilization, positive spotting, positive jigging, repairs, water plugging, concrete repairs, groin repair, rip-rap stabilization, pile repair, pile buffer, high fidelity castings and dyes, reverse osmosis accumulators, sea ramps, undersea deadmen, positive encapsulation anchors, tension leg platforms, and other machine placements. The present invention contemplates the use of the novel cementitious mixtures in making various cementitious structures of which the above list is not exhaustive.

Structures made of the cementitious compositions contemplated by the present invention may also be used in high alkaline soil conditions. Camouflets excavated in desert-like terrain for use in anchor systems have been filled with cementitious mixtures of the present invention. Even though the camouflet structure exposes a large amount of surface area to the potentially degrading soil, the integrity of the cementitious structure remained intact.

Substrate surface preparation or camouflet excavation is not necessary with the present invention. One of the more significant advantages of the cementitious compositions disclosed herein is their capability of forming structures, such as an anchor system, by pouring the mixture directly on an unprepared surface, i.e. underwater seabed. The excellent discrete properties of the present invention allows an easy formation of a cohesive structure under the most adverse pouring conditions.

From the above, it is seen that there has been provided a cementitious composition, in particular an anchor system, which fulfills all of the objects and advantages set forth above. The cementitious compositions of the present invention have improved compressive strength as well as negligible physical and chemical degradation caused by adverse environmental conditions. These advantages are achieved by eliminating the tendency of the cement to develop calcium sulfate rot and to shrink during and after setting. The resultant full wetted surface fidelity prevents exposing areas for possible structural degradation by the environment.

It has been further demonstrated that the present invention provides a cementitious composition which is significantly easier and more effectively and quickly applied under adverse conditions, i.e. sea stream surges, because it is cohesive in the fluid state and remains discrete. It is easier to prepare the cementitious mixtures because any type of mixing water can be used. Prior art cements while used mixing water containing salt or dissolved mineral brines suffer deleterious consequences. The novel cementitious mixtures disclosed herein however, exhibit improved properties. Additionally, the temperature of the mixing water and of the pouring environment is immaterial and leaves the present invention unaffected.

It should be understood that the present invention is not limited to the precise composition of the example, it being intended that the foregoing description of the presently preferred embodiments be regarded as an illustration rather than as a limitation of the present invention. It is the following claims, including all equivalents, which are intended to define the scope of the invention.

What is claimed is:

1. A cementitious mixture comprising by weight:
   at least 80 parts but not in excess of about 120 parts of Portland cement;
   at least about 30 parts but not in excess of 90 parts of refractory cement;
   less than about two parts of an alkali metal carbonate;
   less than about two parts of a carbohydrate; and,
   less than about two parts of a fatty acid ester.

2. A cementitious mixture as defined in claim 1, wherein said mixture further comprises about 210 parts of a suitable aggregate.

3. A cementitious mixture as defined in claim 1, wherein:
   said amount of Portland cement is between about 90 to 110 parts;
   said amount of refractory cement is between about 35 parts to 70 parts;
   said amount of alkali metal carbonate is between about 0.02 to 0.04 parts;
   said amount of carbohydrate is between about 0.02 to 0.04 parts; and,
   said amount of fatty acid ester is between about 0.03 to 0.05 parts.

4. A cementitious mixture as defined in claim 1, wherein the preferred amount of:
   said Portland cement is about 100 parts;
   said refractory cement is about 40 parts;
   said alkali metal carbonate is about 0.03125 parts;
   said carbohydrate is about 0.027 parts; and,
   said fatty acid ester is about 0.041 parts.

5. A cementitious mixture as defined in claim 1, wherein said alkali metal carbonate is lithium carbonate.

6. A cementitious mixture as defined in claim 1, wherein said carbohydrate is selected from a group consisting of gum arabic and guar gum.

7. A cementitious mixture as defined in claim 1, wherein said fatty acid ester is water soluble lecithin.

8. A composition for promoting physical strength in a Portland cement material, said composition comprising by weight approximately equal amounts of an alkali metal carbonate, a carbohydrate, and a fatty acid ester.

9. A composition as defined in claim 8, wherein said alkali, metal carbonate is lithium carbonate.

10. A composition as defined in claim 8, wherein said carbohydrate is selected from a group consisting of gum arabic and guar gum.

11. A composition as defined in claim 8, wherein said fatty acid ester is water soluble lecithin.

12. A cementitious product comprising less than 3 parts of the composition of claim 8 added to about 100 parts of Portland cement, about 40 parts of refractory cement, and about 210 parts of a suitable aggregate.

13. An anchor system for use in undersea or in alkaline soil applications wherein said system comprises an anchor formed of the cementitious mixture defined in claim 1.

14. An anchor system for use on unprepared substrate surfaces comprising a cementitious mixture defined in claim 1.

15. A method of making the cementitious mixture of claim 1 comprising the steps of:
   mixing together the amounts of Portland cement and refractory cement;
   subjecting said mixture to shearing forces to produce a uniform mixture;
   adding the amounts of lithium carbonate, gum arabic and water soluble lecithin to said mixture.

16. A method as defined in claim 15, wherein said method further includes the step of adding aggregate to said mixture while continuing said high shearing forces.

17. The method of making a concrete structure comprising the steps of:
   preparing a composition including approximately equal parts by weight of lithium carbonate, gum arabic, and water soluble lecithin;
   dispersing a quantity of said composition sufficient to afford strengthening effects in a Portland and refractory cement mixture;
   pouring said cement mixture to form the desired structure;
   adding water to said cement mixture; and,
   allowing said mixture to harden.

* * * * *

UNITED STATES PATENT AND TRADEMARK OFFICE
CERTIFICATE OF CORRECTION

PATENT NO. : 4,482,384
DATED : November 13, 1984
INVENTOR(S) : Charles H. Miller It is certified that error appears in the above–identified patent and that said Letters Patent are hereby corrected as shown below:

Col. 6, line 1: replace "35°F" with --32°F--.

Signed and Sealed this

Seventeenth Day of September 1985

[SEAL]

Attest:

DONALD J. QUIGG

Attesting Officer

Commissioner of Patents and Trademarks—Designate